(12) United States Patent
Chapman et al.

(10) Patent No.: US 8,047,351 B2
(45) Date of Patent: Nov. 1, 2011

(54) CLUTCH ADJUSTMENT MECHANISM

(75) Inventors: James Michael Chapman, Bourbon, MO (US); Thomas Christopher Mounce, Steelville, MO (US)

(73) Assignee: Ace Manufacturing & Parts Company, Sullivan, MO (US)

( * ) Notice: Subject to any disclaimer, the term of this patent is extended or adjusted under 35 U.S.C. 154(b) by 295 days.

(21) Appl. No.: 12/478,988

(22) Filed: Jun. 5, 2009

(65) Prior Publication Data
US 2010/0307887 A1 Dec. 9, 2010

(51) Int. Cl.
*F16D 13/75* (2006.01)
(52) U.S. Cl. ............ 192/111.15; 192/70.251; 192/111.7
(58) Field of Classification Search ............ 192/70.251, 192/111.15, 111.6, 111.7
See application file for complete search history.

(56) References Cited

U.S. PATENT DOCUMENTS

| | | | | |
|---|---|---|---|---|
| 1,063,998 A | * | 6/1913 | Morse | 192/70.12 |
| 4,953,680 A | | 9/1990 | Flotow | |
| 5,320,205 A | * | 6/1994 | Kummer et al. | 192/70.251 |
| 5,404,774 A | | 4/1995 | Bond | |
| 5,526,913 A | | 6/1996 | Tarlton | |
| 6,974,013 B1 | | 12/2005 | Catrinta | |
| 2009/0166145 A1 | * | 7/2009 | Mehta et al. | 192/111.15 |

* cited by examiner

*Primary Examiner* — Richard M. Lorence
(74) *Attorney, Agent, or Firm* — Senniger Powers LLP (57) ABSTRACT

An adjustment mechanism for rotating an adjusting ring on a clutch is disclosed. The adjustment mechanism includes a support bracket having an opening therein and a a rotation assembly rotatable about an axis relative to the support bracket. The rotation assembly includes a detent mechanism that is configured to cause both rotational and axial movement of the rotation assembly relative to the support bracket when only a rotational force is applied to the rotation assembly.

16 Claims, 9 Drawing Sheets

CLUTCH ADJUSTMENT MECHANISM

FIELD OF THE INVENTION

The present invention generally relates to friction clutches, and more particularly to an adjustment mechanism for adjusting the adjustment ring of a friction clutch.

BACKGROUND OF THE INVENTION

Friction clutches generally comprise a driven member which is moved into and out of friction engagement with the flywheel of an engine. Over time, the axial position of the friction surface must be adjusted to compensate for wear. This adjustment is typically accomplished by rotating an adjustment ring using various mechanisms and tools, such as those described in U.S. Pat. Nos. 5,526,913, 4,953,680 and 6,974,013. However, the use of these adjustment mechanisms is cumbersome in that they require the user either to remove certain parts of the mechanism before the adjustment can be performed or to apply both axial ("push-down") and rotational forces simultaneously to certain parts of the adjustment mechanism to perform the adjustment.

SUMMARY OF THE INVENTION

This invention is directed to an improved adjustment mechanism for rotating an adjusting ring on a clutch. The adjustment mechanism comprises a support bracket having an opening therein and a rotation assembly rotatable about an axis relative to the support bracket. The rotation assembly comprises an elongate member extending through the opening in the support bracket, a head on the elongate member at one side of the support bracket, and a gear on the elongate member at an opposite side of the support bracket. The gear is secured to the elongate member against both axial and rotational movement relative to the elongate member. The gear is also configured for engagement with a gear on said adjusting ring whereby rotation of the gear is adapted to rotate the adjusting ring. The adjustment mechanism includes a detent mechanism for holding the rotation assembly in selected positions of angular adjustment relative to the support bracket. The detent mechanism comprises a plurality of detent members spaced at intervals around the axis of the rotation assembly either on the rotation assembly or on the support bracket. The detent members are configured such that application of only a rotational force to the head of the elongate member causes the gear of the rotation assembly to move both axially and rotationally relative to the support bracket from one position of angular adjustment to another position of angular adjustment.

In another aspect, this invention is directed to the improved adjustment mechanism described above as installed on a clutch comprising a cover and an adjusting ring threaded to the cover. The support bracket of the adjustment mechanism is mounted on the cover of the clutch.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
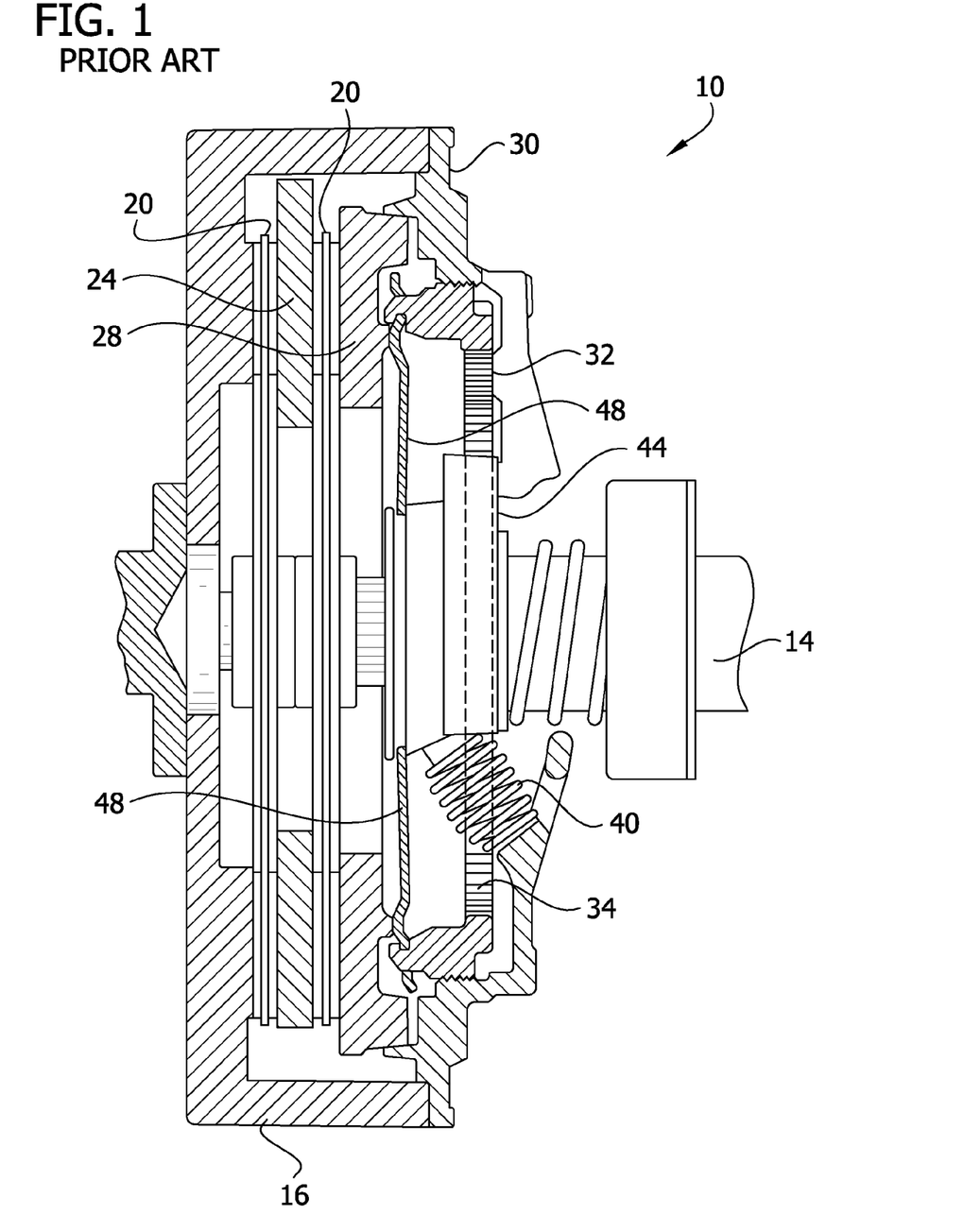
FIG. 1 is a schematic cross-sectional view of a conventional prior art friction clutch.

Referring to FIG. 1, a friction clutch is designated in its entirety by the reference number 10. The clutch 10, shown schematically, is of conventional design. In general, the clutch interconnects a drive shaft (not shown) to a driven shaft 14. Typically the drive shaft is an engine crankshaft of an automotive vehicle which is attached to a flywheel 16, and the driven shaft 14 is a transmission gearbox input shaft. The drive shaft and driven shaft are axially aligned and can be operatively connected through the clutch so that torque is transmitted and the shafts rotate together. A driver of the vehicle uses the clutch to selectively disconnect the shafts, interrupting the transmission of torque, in order to permit a gear shifting operation in the transmission.

As will be understood by those skilled in the art, friction discs 20 having a friction surface are connected (e.g., by splines) to the driven shaft 14 for axial but non-rotatable movement with respect to the driven shaft. The friction discs 20 and, typically, an intermediate plate 24 are positioned between the flywheel 16 and a pressure plate 28. A cover 30 is attached to the flywheel 16 and rotates with the drive shaft. An adjusting ring 32 is threaded to an inner annular surface of the cover 30. The ring has teeth 34 around its inner periphery.

As will be apparent to those skilled in the art, leftward movement of pressure plate 28 results in frictional engagement of the flywheel 16, driven discs 20, intermediate plate 24 and pressure plate 28. When engaged, these components rotate together and transmit the rotation of the flywheel 16 to the driven shaft 14. These components are biased toward their engaged position by springs 40.

The clutch 1 includes a conventional clutch release assembly 44 and a number of levers 48 extending between the release assembly and the adjusting ring 32. The arrangement is such that depression of a clutch pedal in the vehicle causes a rightward movement of the release assembly 44 to disengage the clutch, and release of the clutch pedal causes the release assembly to move to the left under the bias of the springs 40 to cause the levers 48 to apply a leftward force to the pressure plate to engage the clutch. As wear occurs on the friction surfaces of the driven discs 20, the pressure plate 28 must travel an additional distance to the left to engage the clutch. To compensate for this wear, the adjusting ring 32 is rotated with respect to the cover 30, resulting in leftward movement of the adjusting ring and levers 48 with respect to the cover.

Figure 2:
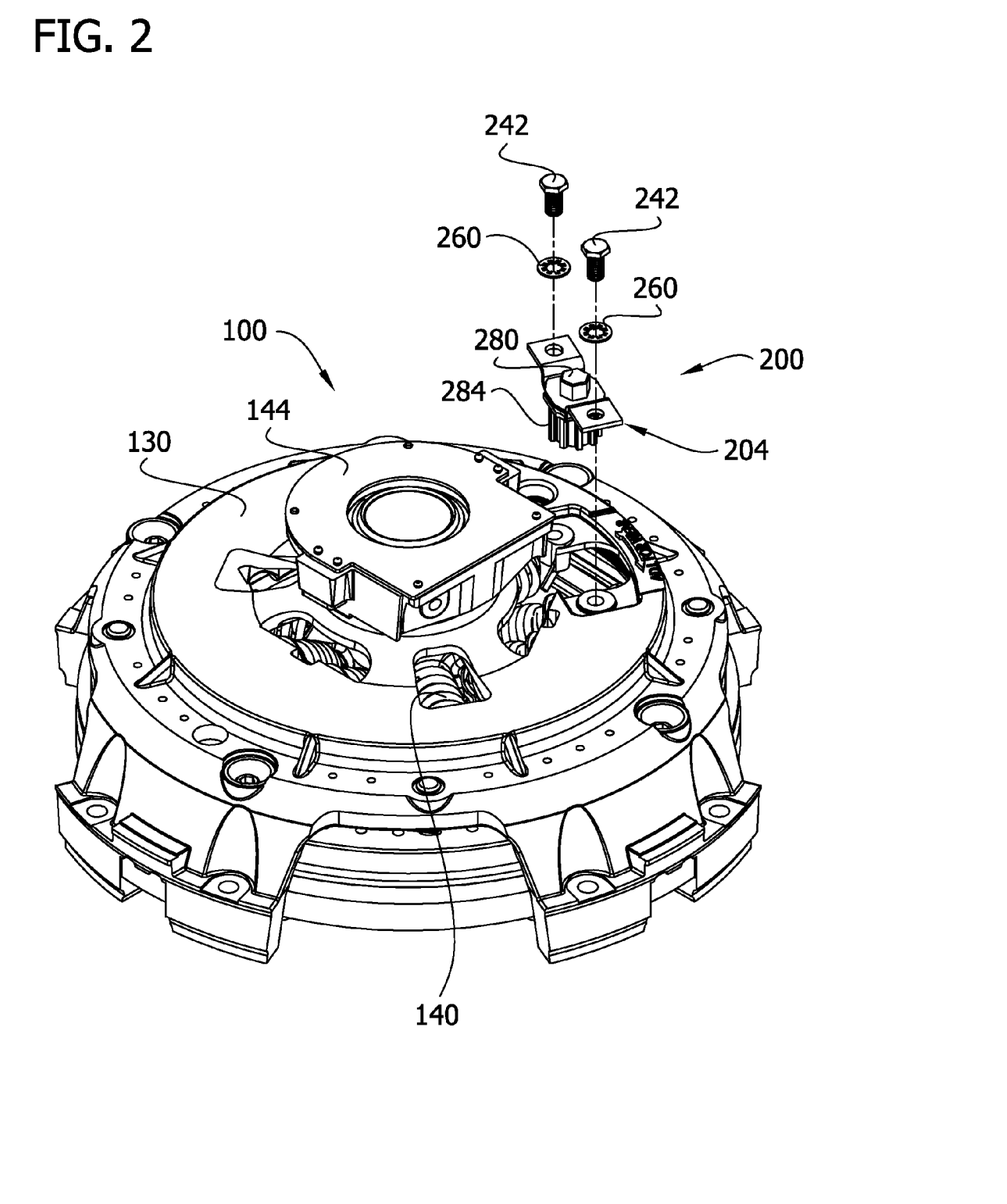
FIG. 2 is a perspective view of a clutch using an adjustment mechanism of the present invention, parts of the adjustment mechanism being exploded away from the clutch for clarity.
Figure 3:
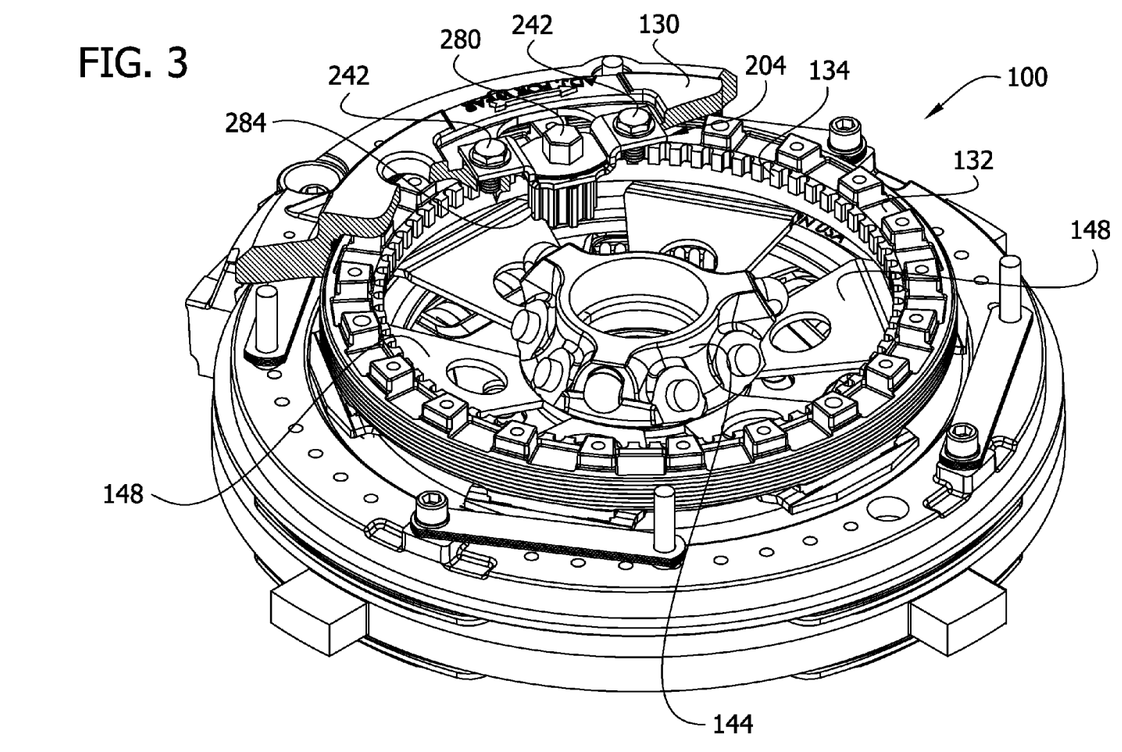
FIG. 3 is a view similar to FIG. 2 but showing the adjustment mechanism mounted on the cover, portions of the cover and other components being broken away for clarity.

FIGS. 2 and 3 show a different embodiment of a friction clutch, generally designated 100. The clutch 100 is similar to the clutch 10 and corresponding parts are designated by corresponding reference numbers, plus 100 (e.g., spring 140, a release assembly 144, and levers 148). The clutch 100 is equipped with an adjustment mechanism of this invention, generally designated 200, which is used to rotate the adjusting ring 132 to compensate for the wear of friction components of the clutch, as discussed above. The adjustment mechanism 200 is described in detail below.

Figure 4:
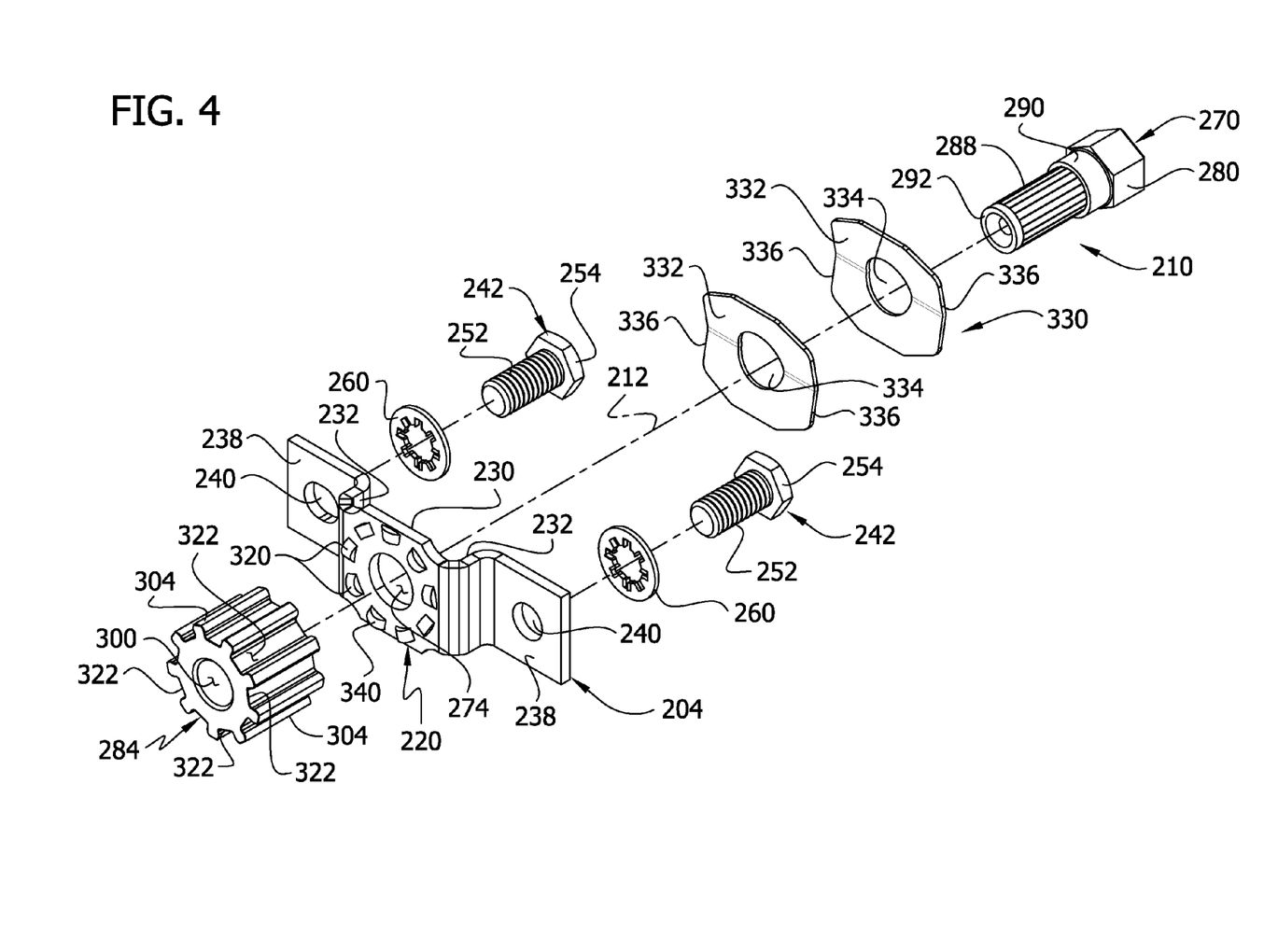
FIG. 4 is an exploded perspective of parts of the adjustment mechanism.

Referring to FIG. 4, the adjustment mechanism 200 comprises a support bracket 204 adapted to be affixed to the clutch 100, a rotation assembly 210 rotatable about an axis 212 relative to the support bracket and configured for engagement with the adjusting ring 134, and a detent mechanism generally designated 220 for holding the rotation assembly 210 in predetermined positions of rotational adjustment. Each of these components is described in more detail below.

The support bracket 204 is of a rigid material (e.g., metal) and comprises a bottom wall 230 and opposing side walls 232 defining a generally U-shaped channel. Two fastening flanges 238 extend from respective side walls 232 generally parallel to the bottom wall 230 and have openings 240 for receiving fasteners 242 to secure the bracket 204 to the cover 130. In the illustrated embodiment, the fasteners 242 are bolts having threaded shanks 252 and heads 254 with flats. Lock washers 260 are provided for preventing unintentional loosening of the fasteners 242 after they are tightened. The heads 254 of these fasteners 242 project outward a distance beyond the plane 262 of the outer surfaces of the two fastening flanges 242 (see FIG. 5). The support bracket 204 could have other shapes within the scope of this invention. For example, it could be generally planar instead of U-shaped.

The rotation assembly 210 comprises an elongate member 270 extending through an opening 274 in the bottom wall 230 of the support bracket 204, a head 280 with flats on the elongate member at one side of the support bracket, and a gear 284 on the elongate member 270 at an opposite side of the support bracket. The gear 284 is configured for engagement with the teeth 134 of the adjustment ring 132, as will be described.

In the embodiment of FIG. 4, the elongate member 270 is a shoulder bolt having a shank 288 with a larger-diameter section 290 adjacent the head 280 of the bolt and a smaller-diameter section 292 toward the opposite end of the bolt. The larger-diameter shank section 290 has a close clearance fit (e.g., ±0.007 in) in the opening 274 of the support bracket 204. The smaller-diameter section 292 is knurled and has a press fit (e.g., requiring an insertion force of 4500 lbs) in a central axial through-bore 300 in the gear 284 to secure the gear against both axial and rotational movement relative to the elongate member 270. Desirably, the free end of the shank 288 is swedged to further secure the bolt 270 to the gear 284. The elongate member 270 could have other configurations within the scope of this invention.

In this particular embodiment, the gear 284 is a spur gear having teeth 304 extending axially of the spur gear at intervals spaced circumferentially around the spur gear. These teeth 304 are configured to mesh with the teeth 134 on the adjusting ring 132. The arrangement is such that rotation of the elongate member 270 and spur gear 284 causes rotation of the adjusting ring 132 to move it to the left a distance sufficient to compensate for the wear of the friction discs, as previously mentioned. The gear 284 could have other configurations within the scope of this invention.

The detent mechanism 220 comprises a plurality of detent members 320 on the support bracket 204 spaced at intervals around the axis 212 and a plurality of receivers 322 on the spur gear 284 spaced at intervals around the axis for receiving the detent members. In the illustrated embodiment, the detent members 320 comprise a plurality of rounded projections (also designated 320) protruding from the inner (lower) surface of the bottom wall 230 of the support bracket 204, and the receivers 322 comprise the circumferential spaces between the axial teeth 304 on the gear 284. The detent mechanism 220 also includes a spring device 330 comprising, in this particular embodiment, a number (e.g., two) of annular springs 332 interposed between the bottom wall 230 of the support bracket 204 and the head 280 of the adjustment bolt 270. The springs 332 urge the bolt in an axial direction toward a position (FIG. 5) in which the head 280 of the bolt is spaced from the bottom wall 230 of the bracket and the projections 320 on the bracket are received in the spaces 322 between respective teeth 304 of the spur gear 284 to hold the gear (and the adjusting ring 132 in mesh with the gear) against rotation.

Figure 5:
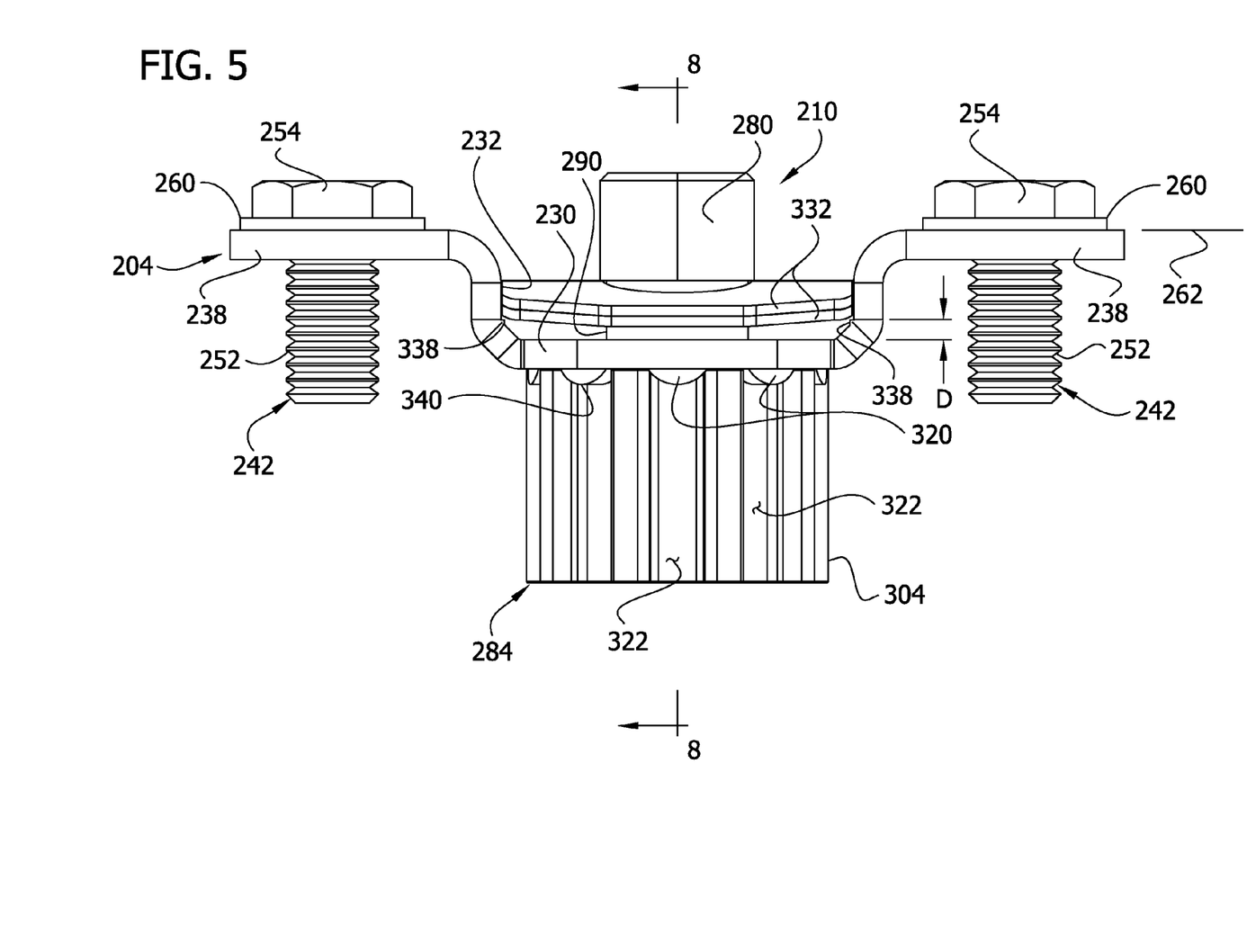
FIG. 5 is a side elevation of the adjustment mechanism showing detent members in a locking position.
Figure 6:
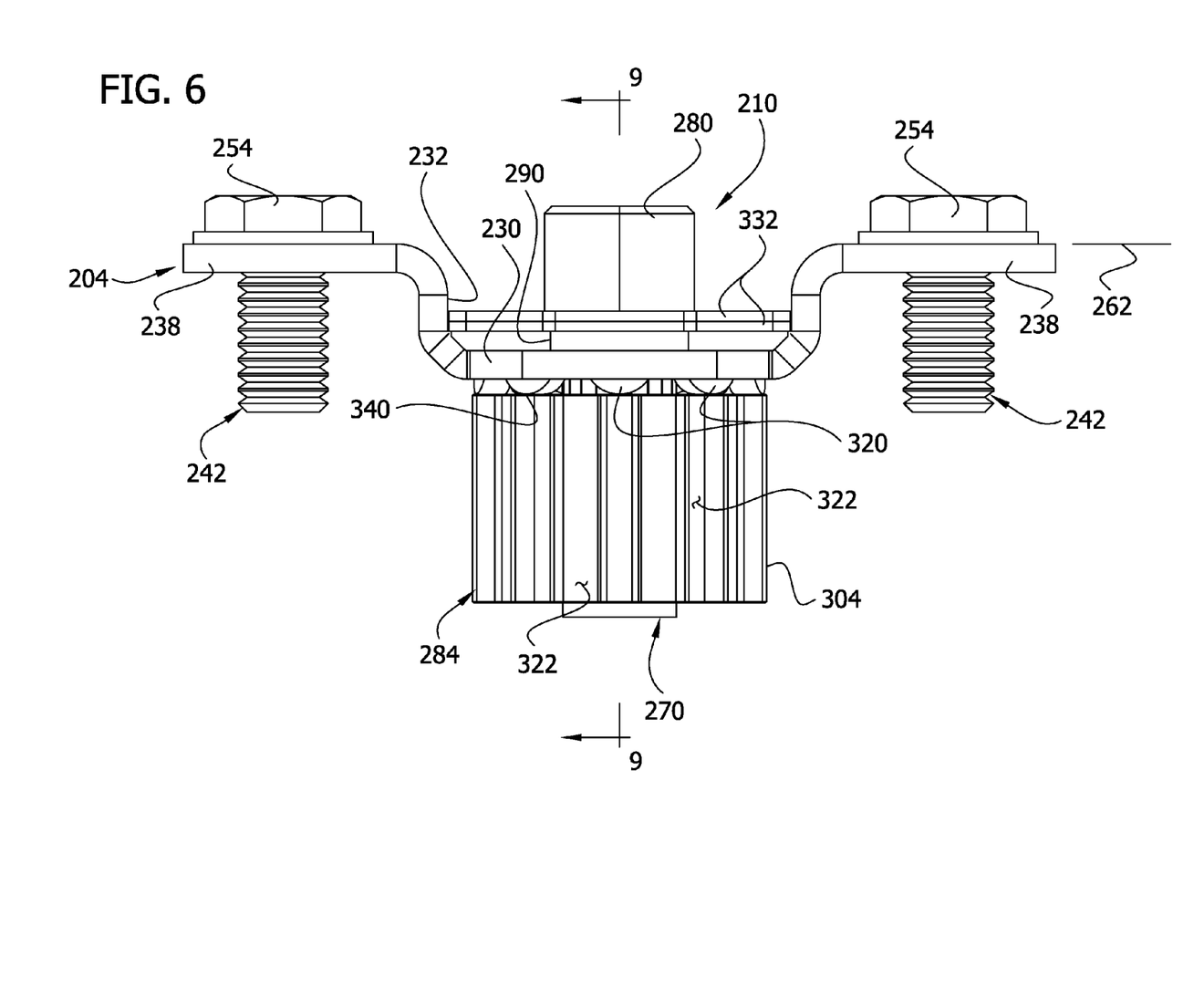
FIG. 6 is a side elevation similar to FIG. 5 but showing the detent members in a release position.
Figure 7:
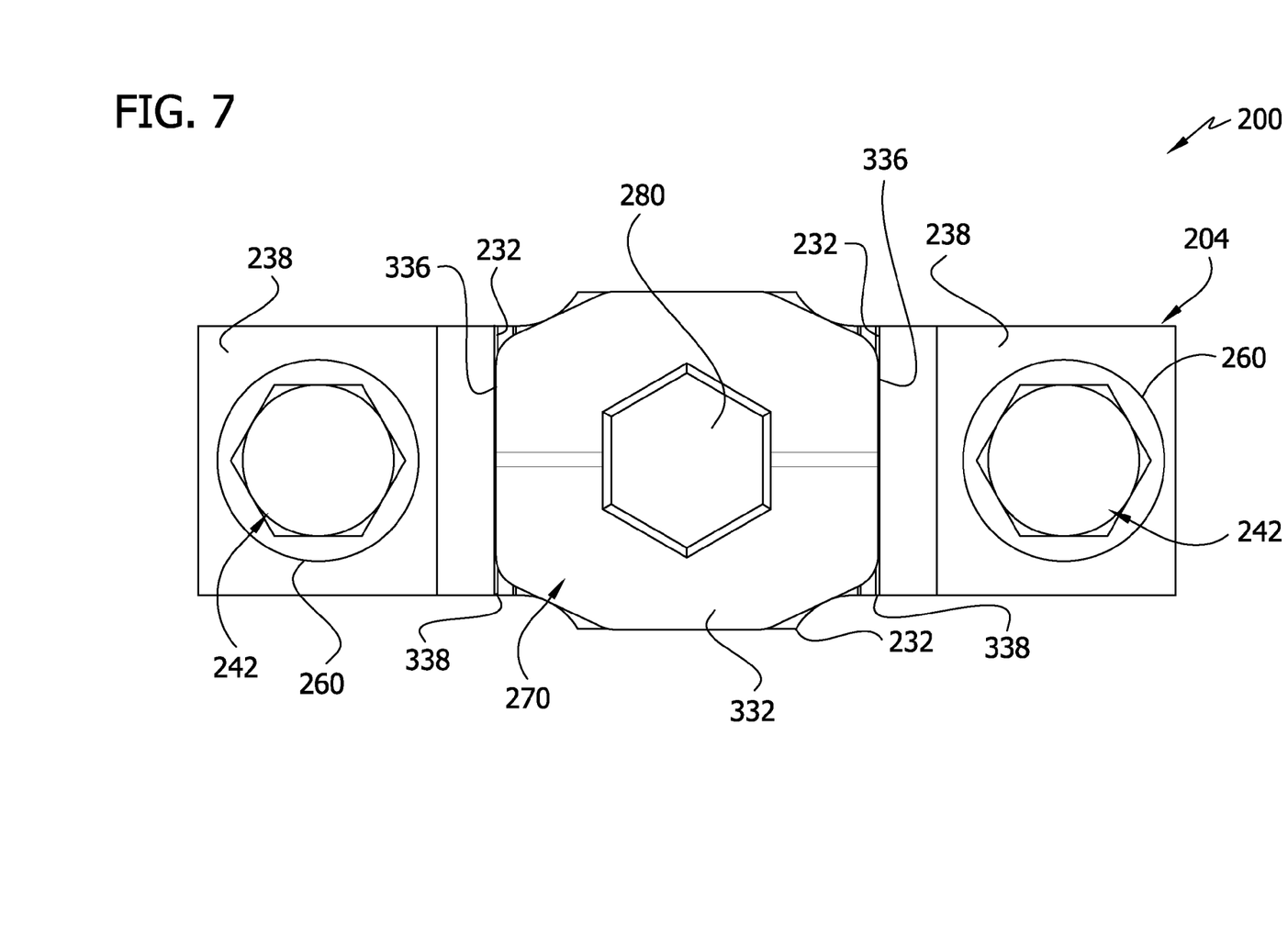
FIG. 7 is a top plan of the adjustment mechanism in a selected position of angular adjustment.
Figure 8:
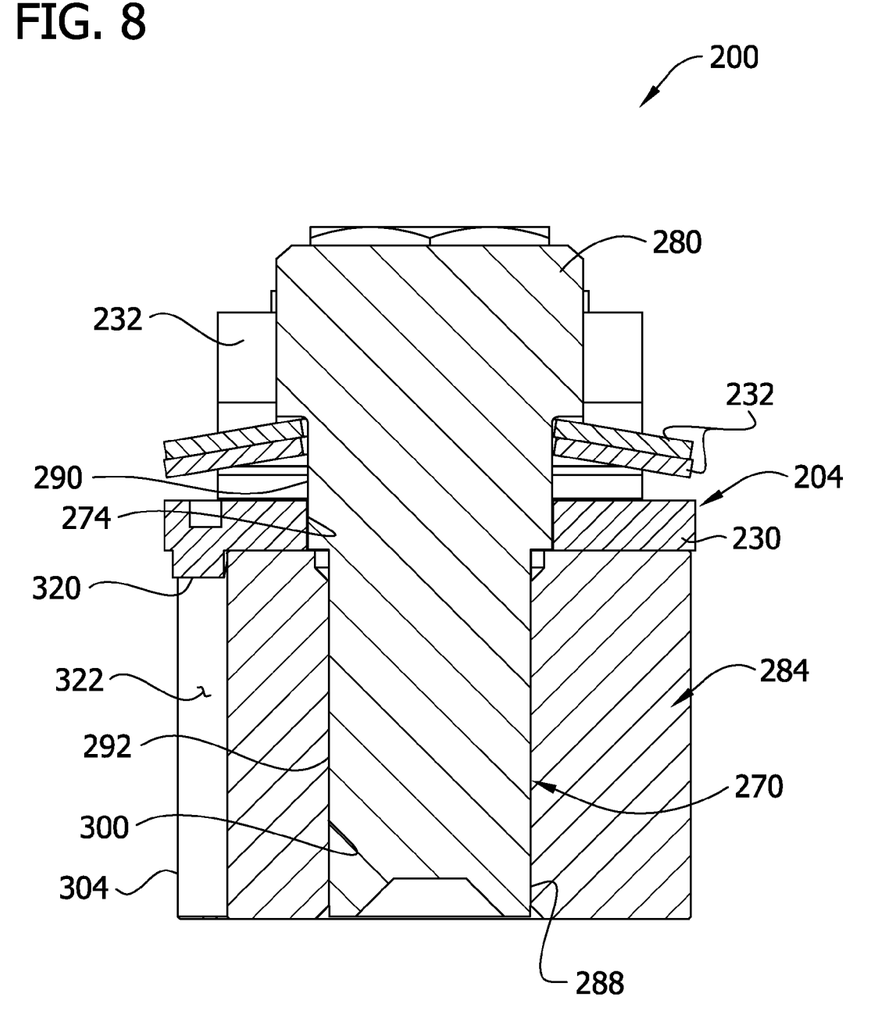
FIG. 8 is an enlarged section along 8-8 of FIG. 5.
Figure 9:
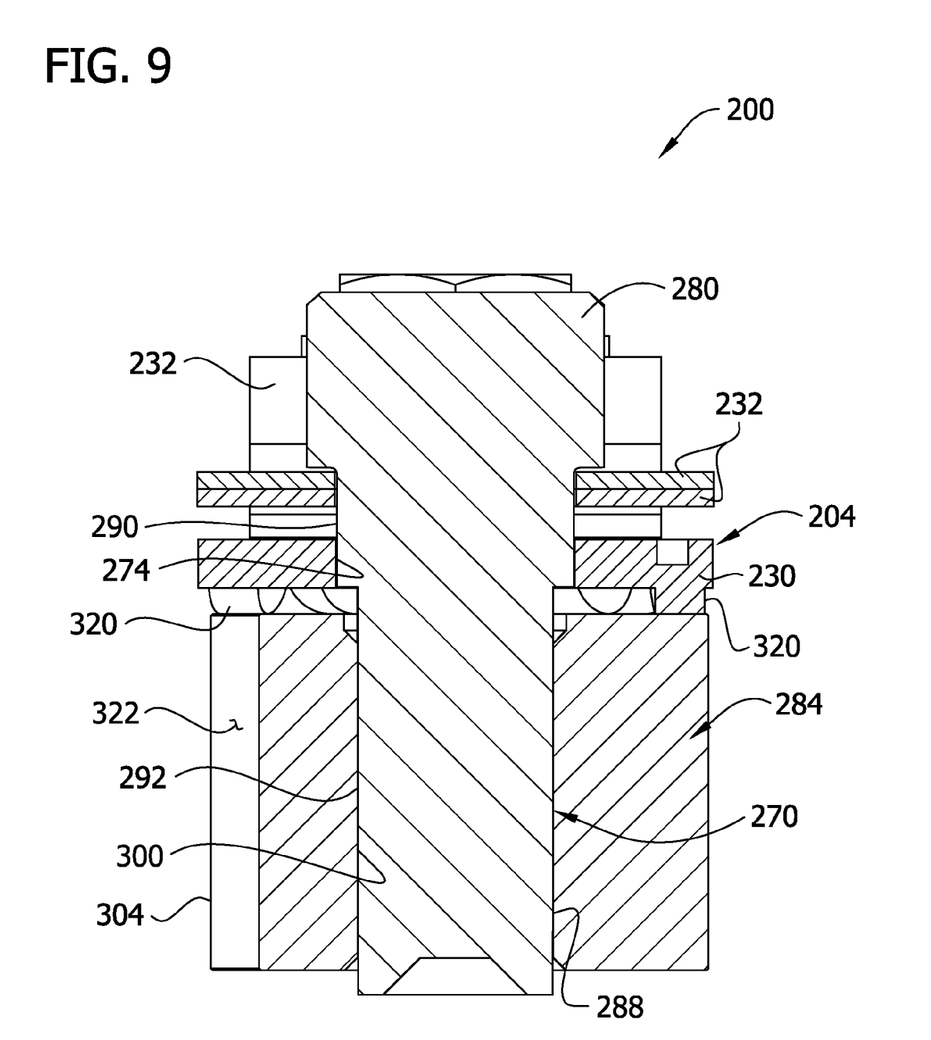
FIG. 9 is an enlarged section along 9-9 of FIG. 6.

Referring to FIGS. 4-6, the illustrated springs 332 are relatively thin generally rectangular plates, each having a central opening 334 and opposite side edges 336. The opening 334 is sized for a close clearance fit of the larger-diameter shank section 290 of the elongate member 270 in the opening. When the rotation assembly 210 is assembled with the support bracket 204, the springs 332 are dimensioned to rest on shoulders 338 formed on the side walls 232 of the support bracket 204 at a location spaced above the bottom wall 230 of the bracket. Desirably, when in an unstressed (relaxed) condition, the plate forming each spring 332 has a small pre-bend (FIG. 4) in it so that the plate is slightly arched or V-shaped. In FIG. 5, the springs 332 are in a generally unstressed condition in which the upper spring engages the head 280 of the bolt 270 and the lower spring is spaced a distance D above the bottom wall 230 of the support bracket 204 to hold the bolt and gear 284 in a position in which the detent members 320 are in a "locking" position received in the spaces 322 between the teeth 304 of the gear to hold the gear against rotation. In FIG. 6, the springs 332 are resiliently deflected in a downward direction to a generally planar, generally stressed condition in which the detent members 320 have moved to a "release" position removed from the spaces 332 between the teeth 304 of the gear 284 to allow rotation of the gear to a different position of angular adjustment. Thus, the springs 332 are resiliently deflectable to allow movement of the elongate member 270 and gear 284 in an axial direction a distance corresponding to some fraction of the distance D, which corresponds to an axial movement of the detent members 320 between their locking and release positions. Desirably, the opposite side edges 336 of the springs 332 are sized for engagement with respective side walls 232 of the support bracket to prevent rotation of the springs 332 when the bolt 270 is rotated in a manner to be described below.

The spring device 330 may have other configurations within the scope of this invention. For example, the plates forming the springs 332 may have a planar configuration when unstressed and a downwardly bowed configuration when stressed. Also, the number and type of springs used may vary.

As best shown in FIG. 4, there are nine projections 320 spaced at equal angular intervals (40-degree intervals) around the bracket opening 274, one projection for each of the spaces 322 between the teeth 304 of the gear 284. However, the number of projections 320 can vary (e.g., one, two, three etc.). Desirably, the number of projections 320 is three or greater. Similarly, the size of the gear 284 and the number of teeth 304 on the gear can vary. Further, the ratio of the number of detent members 320 to the number of receivers 322 (e.g., the number spaces around the gear 284 between the teeth 304) can vary.

The projections 320 are suitably configured so that a simple rotational force applied to the head 280 of the adjustment bolt 270 will cause both rotational and axial movement of the bolt and gear 284 relative to the support bracket 204. In the illustrated embodiment, each projection 320 is configured to have a rounded surface 340. When a rotational force is applied to the adjustment bolt 270, the teeth 304 on the spur gear 284 contact respective curved surfaces 340 on the projections 320, and a sufficient rotational force will cause the gear teeth to ride up the curved surfaces. This interaction between the teeth 304 and the detent members 320 results in an axial movement of the bolt 270 and spur gear 284, against the urging of the springs 332 which deflect as shown in FIG. 6 to allow such movement, toward a position in which the head 280 of the bolt is closer to the bottom wall 230 of the support bracket 204 and the projections 320 are in their release position removed from the spaces 322 between the teeth 304. The application of continued rotational force to the head of the bolt causes the teeth to ride over and down the respective projections 320, under the urging of the springs 332, toward their locking position in which the projections 320 are received in respective spaces 322 between the teeth 304, and the gear 284 is advanced by a predetermined angular increment (e.g., 40 degrees) corresponding to the angular spacing between the teeth of the gear. Rotation of the gear 284 by this increment rotates the adjustment ring 132 a predetermined angular distance.

In effect, therefore, the projections 320 on the support bracket 304 function as cams and the teeth 304 of the spur gear 284 function as cam followers to move the bolt 270 and spur gear in both rotational and axial directions when a purely rotational force is applied to the bolt head 280. Unlike the prior art devices, there is no need for the user to apply both rotational and axial forces to the components of the rotation assembly. Nor is there any need for the user to remove or loosen components of the adjustment mechanism 200 before the adjustment process begins. The user simply rotates the bolt 270 and spur gear 284 through a number of increments (each corresponding to the spacing between two adjacent detent members 320) sufficient to rotate the adjusting ring 132 and thereby move it the desired axial distance. The detent mechanism 220 also facilitates the adjustment process by allowing the user to readily determine the angular extent of rotation of the gear 284 and the corresponding axial movement of the adjusting ring 132. The user simply counts the number of "clicks" as the gear 284 moves incrementally from one predetermined position to the next, each "click" corresponding to a predetermined rotational increment of the gear and corresponding predetermined rotational and axial increments of the adjusting ring.

The amount of torque required to rotate the bolt 270 and gear 284 will depend on various factors, including the strength of the spring device 330. In one example, the initial "break-over) torque required to rotate the bolt when the adjuster is not engaged with the clutch may be about 110 in-lbs., and the torque required to continue rotation is about 75-80 in-lbs. The torque required to rotate the bolt 270 when the gear 284 is engaged with the adjusting ring 132 may be about 140 in-lbs. Other torques are possible.

Referring to FIG. 5, the fastening flanges 238 of the support bracket 204 have outer surfaces defining the outer surface plane 262. The head 280 of the rotation assembly projects outward beyond this outer surface plane to facilitate access to the head. In this particular embodiment, the heads 254 of the threaded fasteners 242 securing the bracket 204 to the clutch 100 have outer surfaces generally coplanar with the outer surface of the head of the bolt 270. Other configurations are possible.

Having described the invention in detail, it will be apparent that modifications and variations are possible without departing from the scope of the invention defined in the appended claims. For example, the detent mechanism 220 could take other forms, such as projections on the gear 284 received in recesses or openings in the support bracket 204.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying figures shall be interpreted as illustrative and not in a limiting sense.

What is claimed is:

1. An adjustment mechanism for rotating an adjusting ring on a clutch, said adjustment mechanism comprising
a support bracket having an opening therein,
a rotation assembly rotatable about an axis relative to said support bracket, said rotation assembly comprising an elongate member extending through the opening in the support bracket, a head on the elongate member at one side of the support bracket, and a gear on the elongate member at an opposite side of the support bracket, said gear being secured to the elongate member against both axial and rotational movement relative to the elongate member, said gear being configured for engagement with a gear on said adjusting ring whereby rotation of the gear is adapted to rotate the adjusting ring, and
a detent mechanism for holding the rotation assembly in selected positions of angular adjustment relative to the support bracket, said detent mechanism comprising a plurality of detent members spaced at intervals around said axis either on the rotation assembly or on the support bracket, said detent members being configured such that application of only a rotational force to the head of the elongate member causes the gear of the rotation assembly to move both axially and rotationally relative to the support bracket from one position of angular adjustment to another position of angular adjustment.

2. An adjustment mechanism as set forth in claim 1 wherein said detent members are either on the gear or on the support bracket, and wherein said detent mechanism further comprises a plurality of receivers on the other of the gear and the support bracket, and a spring device for urging the detent members into engagement with said receivers thereby to hold the rotation assembly at selected positions of rotation relative to the support bracket.

3. An adjustment mechanism as set forth in claim 2 wherein said detent members are on the support bracket and said receivers are on the gear of the rotation assembly.

4. An adjustment mechanism as set forth in claim 2 wherein said detent members are rounded to facilitate rotation of the rotation assembly relative to the support bracket.

5. An adjustment mechanism as set forth in claim 2 wherein said gear of the rotation assembly is a generally cylindrical spur gear having axial teeth spaced at circumferential intervals around the spur gear, and wherein said receivers are defined by spaces between said axial teeth for receiving said detent members.

6. An adjustment mechanism as set forth in claim 2 wherein said spring device comprises at least one spring interposed between the head of the rotation assembly and the support bracket.

7. An adjustment mechanism as set forth in claim 1 wherein said support bracket comprises a bottom wall and opposing side walls defining a generally U-shaped channel, and fastening flanges extending from respective side walls generally parallel to said bottom wall, said fastening flanges having outer surfaces defining an outer surface plane, and wherein said head of the rotation assembly projects outward beyond said outer surface plane to facilitate access to the head.

8. An adjustment mechanism as set forth in claim 7 further comprising a pair of threaded fasteners for securing the support bracket in fixed position, said threaded fasteners having heads with outer surfaces generally coplanar with an outer surface of the head of the rotation assembly.

9. A friction clutch comprising
a cover,
an adjusting ring threaded to the cover, and
an adjustment mechanism on the cover,
said adjustment mechanism comprising
    a support bracket mounted on the cover and having an opening therein,
    a rotation assembly rotatable about an axis relative to said support bracket, said rotation assembly comprising an elongate member extending through the opening in the support bracket, a head on the elongate member at one side of the support bracket, and a gear on the elongate member at an opposite side of the support bracket, said gear being secured to the elongate member against both axial and rotational movement relative to said axis, said gear being in engagement with a gear on said adjusting ring whereby rotation of the gear rotates the adjusting ring, and
    a detent mechanism for holding the rotation assembly in selected positions of angular adjustment relative to the support bracket, said detent mechanism comprising a plurality of detent members either on the rotation assembly or on the support bracket, said detent members being configured such that application of only a rotational force to the head of the elongate member causes the gear of the rotation assembly to move both axially and rotationally relative to the support bracket from one position of angular adjustment to another position of angular adjustment whereby said adjusting ring is also moved to a selected position of adjustment.

10. A clutch as set forth in claim 9 wherein said detent members are either on the gear or on the support bracket, and wherein said detent mechanism further comprises a plurality of receivers on the other of the gear and the support bracket, and a spring device for urging the detent members into engagement with said receivers thereby to hold the rotation assembly at selected positions of rotation relative to the support bracket.

11. A clutch as set forth in claim 10 wherein said detent members are on the support bracket and said receivers are on the gear of the rotation assembly.

12. A clutch as set forth in claim 10 wherein said detent members are rounded to facilitate rotation of the rotation assembly relative to the support bracket.

13. A clutch as set forth in claim 10 wherein said gear of the rotation assembly is a generally cylindrical spur gear having axial teeth spaced at circumferential intervals around the spur gear, and wherein said receivers are defined by spaces between said axial teeth for receiving said detent members.

14. A clutch as set forth in claim 10 wherein said spring device comprises at least one spring interposed between the head of the rotation assembly and the support bracket.

15. An adjustment mechanism as set forth in claim 9 wherein said support bracket comprises a bottom wall and opposing side walls defining a generally U-shaped channel, and fastening flanges extending from respective side walls generally parallel to said bottom wall, said fastening flanges having outer surfaces defining an outer surface plane, and wherein said head of the rotation assembly projects outward beyond said outer surface plane to facilitate access to the head.

16. A clutch as set forth in claim 15 further comprising a pair of threaded fasteners for securing the support bracket in fixed position, said threaded fasteners having heads with outer surfaces generally coplanar with an outer surface of the head of the rotation assembly.

* * * * *